sections respectively along lines I—I and III—III of FIGS. 2 and 4, through a known mold, inside which is arranged a beaded stringer tape, before and during the final injecting step.

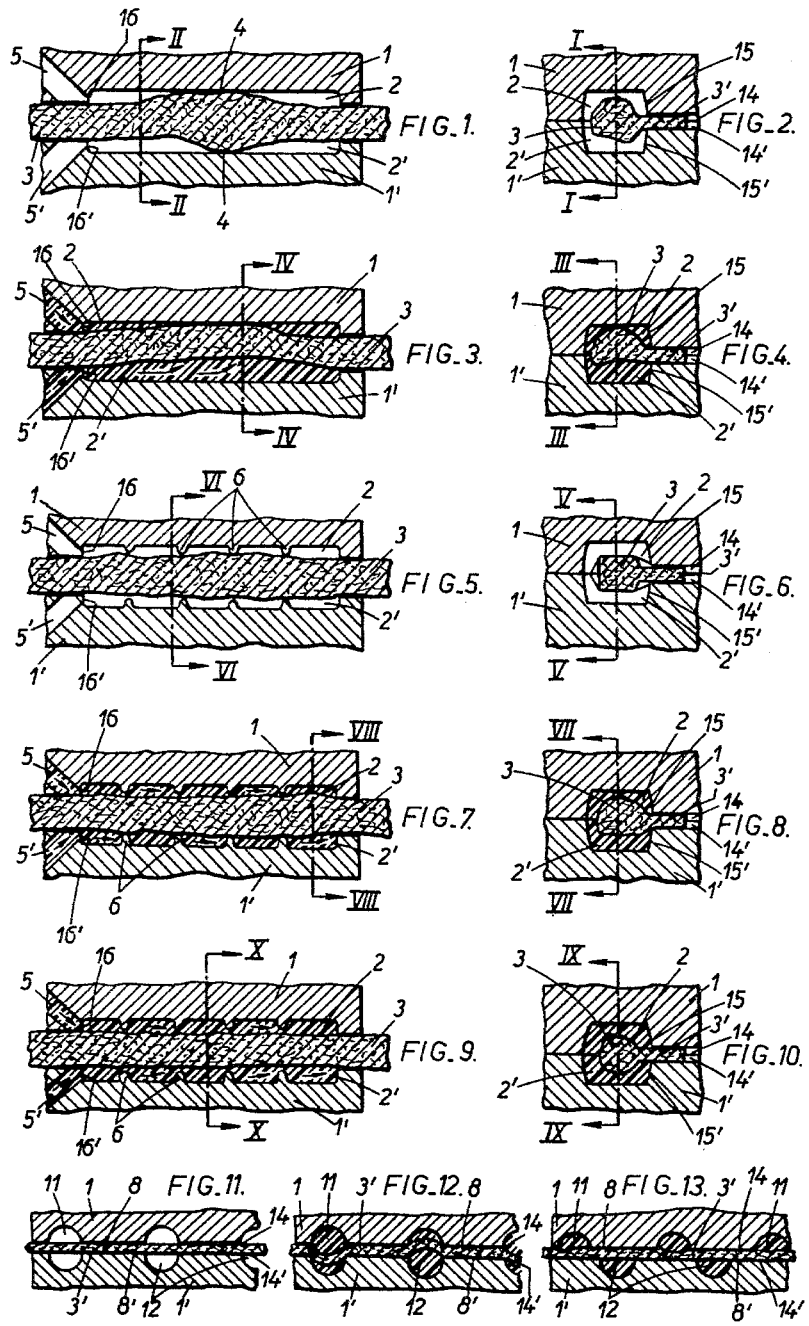

United States Patent Office 3,219,743
Patented Nov. 23, 1965

3,219,743
METHOD OF CASTING END STOPS
ON ZIP FASTENERS
Wilhelm Berler, Rue de la Clinique 25, Brussels, Belgium
Filed Apr. 3, 1962, Ser. No. 184,784
Claims priority, application Belgium, Apr. 12, 1961,
602,478
1 Claim. (Cl. 264—275)

This invention relates to a method of injection casting end stops on zip fasteners stringer beaded tapes.

The injection of fastener parts in injectable material on the edges or the beads or braids of the stringer tapes is known. However, when it is desired to make more extensive members than the usual teeth, and notably start and end parts, that is stop ends, it is very difficult to centre correctly the bead inside the mold cavities, which results in a faulty covering of the bead by the injected material. Parts are thus obtained with an imperfect appearance and with a reduced strength.

The present invention has for its object to insure an accurate centering of the beaded edge of the stringer tapes inside the mold when manufacturing the end stops of zip fasteners, so as to make possible to obtain an accurate injection all around the bead.

For this purpose, the method according to the invention comprises placing of a predetermined section of the bead between a plurality of substantially parallel ribs extending transversely to the tape from opposite walls of cavities a pair of dies, the spaces limited by two succeeding ribs, the portion therebetween of the bead and of the walls of the cavities forming succeeding casting chambers, and injecting casting material into the cavities of the closed dies transversely to said ribs, said casting material passing successively from one of said casting chambers to the next casting chamber through gaps that are formed between the bead and the ribs under the thrust of the casting material.

This invention has also for its purpose a mold suitable for putting the above method in practice. A such casting mold according to the invention comprises a lower die plate, an upper die plate, registering elongated die cavities in said lower and upper die plates forming a casting housing, end, upper and lower, forward and back walls limiting said housing, substantially parallel ribs provided into the housing walls transversely to the length thereof and at least one casting material feeding channel opening into one of said end walls.

This invention has further for its purpose to make the above mold suitable for making an accurate injection of the reinforcing gratings which are located beside said end stops partially over the stringer tape width. For this purpose, the mold according to the invention comprises further registering recesses provided in said upper and lower die plates, said recesses communicating with said cavities through said back wall, grooves provided into the bottom walls of said recesses, said grooves in the upper recess being offset with respect to the grooves of the lower recess and means for feeding the injection material into the lower grooves and to the upper grooves.

Finally this invention has for its purpose zip fasteners made in accordance with the above method and by means of the above casting mold. Said zip fasteners comprise each fabric stringer beaded tapes, end elongated stops cast on said beads, and shallow notches provided on opposite faces of said end stops, said notches extending transversely to the length of the stops.

Other details and features of the invention will stand out from the description given below, by way of non-limitative example, of a particular embodiment of the invention, with reference to the accompanying drawings in which:

FIGS. 1 and 3 are diagrammatic views, as lengthwise sections respectively along lines I—I and III—III of FIGS. 2 and 4, through a known mold, inside which is arranged a beaded stringer tape, before and during the final injecting step.

FIGS. 2 and 4 are sections, respectively along lines II—II and IV—IV of FIGS. 1 and 3.

FIGS. 5, 7 and 9 are diagrammatic views, as lengthwise sections respectively along lines V—V, VII—VII and IX—IX of FIGS. 6, 8 and 10, through a mold according to the invention inside which is arranged a beaded stringer tape, before, at the beginning and at the end of the injection.

FIGS. 6, 8 and 10 are sections respectively along lines VI—VI, VIII—VIII and X—X of FIGS. 5, 7 and 9.

FIGS. 11 and 12 are diagrammatic views, as lengthwise sections through a part of the mold adjacent that part which is shown in FIGS. 1 and 3 and which encloses the tape, for making a grating thereon, before and at the end of the injection.

FIG. 13 is a section similar to FIGS. 11 and 12, but through a mold according to the invention, at the end of the injection.

In the various figures, the same reference numerals pertain to similar elements.

As shown in FIGURES 1 to 4, a mold which is comprised of an upper die plate 1, a lower die plate 1' each one having an elongated die cavity 2, 2' is closed around a fabric stringer tape 3' having a bead 3 thereon, to cast an end stop of a zip fastener, for instance to make the slider. The walls of the cavities 2, 2' are flat.

Closing of the mold compresses somewhat the tape 3' and the bead 3 and, due to the own resiliency thereof, the bead fills substantially completely the cavities 2, 2', in the case of lengthy and relatively thin injected parts. At the locations 4 and 4', it contacts the bottom of the cavities 2, 2'.

Under these conditions, when the injection material, for example a thermoplastic synthetic material, is pressure-injected through the casting channels 5, 5' which open into the end walls 16, 16' of the die cavities 2, 2', this material entering generally both cavities 2, 2' with some shifting due to many causes which are difficult to oppose in practice, the material displacement is out of balance immediately after the injection beginning due to the shape taken by the bead 3. When the final pressure is reached, the unbalance increases and prevents an uniform coating of the bead. At the end of the injection, this bead often lies as shown in FIGURES 3 and 4. Consequently, some parts of the bead 3 are not at all coated by the injection material.

To avoid this drawback of the offsetting of bead 3 during the injection and to obtain an uniform coating of the bead by the injection material, those walls which comprise the bottoms of the cavities 2, 2' of the two half-molds 1 and 1' are provided, according to the invention, with ribs 6 which extend at right angle to the lengthwise direction of the bead 3. When in such a mold, the injection material is fed through the casting channels 5, 5', those spaces of the cavities 2, 2' which are limited by the ribs 6 are filled successively with material, the ribs 6 comprising necks in such a way that the material flowing along a direction at right angle to the ribs 6, surrounds the bead over a length thereof which extends between two succeeding ribs and pushes it away from the ribs 6, to flow further on, by compressing it concentrically, and finally the material passes completely around the bead over the whole length of the cavity 2, 2'.

FIGURES 10 to 13 show sections in a plane parallel to the plane of sections shown in FIGURES 1, 3, 5 and 9 but passing through the stringer tape and not through the bead; it is known to cast on the opposite side of a stringer tape 3' a reinforcing grating. In fact as shown in FIGURES 2, 4, 6 and 8, the upper plate 1 and the lower plate 1' of the casting mold are provided with registering recesses 14, 14' communicating with the cavities 2, 2' through the back wall 15, 15'; the bottom walls 8, 8' of said recesses 14, 14' engage the opposite faces of the tape 3' and they are provided with grooves 11, 12 which are arranged into a definite pattern and for instance as a grating, these grooves having such an extent as to communicate with the mold cavities 2, 2' through said back wall 15, 15'. The injection material thus enters the grooves 11, 12, in such a way that over each stringer face is formed a grating adjacent the end stop and which comprises a stiffening for the stringer.

If, as shown in FIGURES 11 and 12, the grooves 11, 12 of both half molds 1, 1' were to be arranged facing one another, an instantaneous pressure differential over both sides of the stringer due to an offsetting in the feeding of the injection material into the facing grooves, would move the stringer tape out of the centered position thereof and would bring it to a position as shown in FIGURE 12. The pressure rise at the end of the injecting step would but maintain or even increase the unbalance. The result thereof would be incomplete grating patterns, an unsuitable appearance and an insufficient strength.

To avoid these drawbacks, the grooves 11, 12 in the mold according to the invention are mutually offset with respect to both sides of the stringer tape 3', as shown in FIGURE 13, in such a way that opposite each groove 11 (12) in a recess 14 (14') lies, over the other side of stringer 3', the joint 8' (8) of the second recess 14' (14). Consequently, the grating patterns located over both sides of the ribbon are offset among them. Under these conditions, during the injection, the stringer remains in the suitable position thereof as it is somehow pushed against the plane portions of the opposite bottom wall 8, 8' by the injection material fed under pressure into said groove.

The pattern offset over both sides of the stringer tape may be dimensioned according to the requirements pertaining to the stitching of the ribbon on a clothing piece or similar.

The zip fasteners provided with end stops which are made with a mold provided with one or several elements as described hereinbefore with reference to FIGURES 5 to 10 and 13 are also part of the invention. These end stops which are attached to the beads of the fabric stringer tapes, are provided on those faces which cover these edges, with shallow notches at right angle to the lengthwise direction of the tapes, which notches correspond to the ribs 6 of the mold described above. The end stops can extend sidewise over part of the stringers width by means of gratings the legs of which are mutually offset with respect to both sides of the stringers.

It must be understood that the invention is in no way limited to the above embodiments and that many changes may be brought therein without departing from the scope of the invention as defined by the appended claim.

I claim:

The method of casting end stops on zip fasteners fabric beaded stringer tapes, which comprises placing of a predetermined section of the bead between a plurality of substantially parallel ribs extending transversely to the tape from opposite walls of cavities of a pair of dies with said ribs engaging said bead, the spaces limited by two succeeding ribs, the portion therebetween of the bead and of the walls of the cavities forming succeeding casting chambers, and injecting simultaneously in each die cavity a casting material flowing upon the opposite sides of the tape, transversely to said ribs, said casting material passing successively from one of said casting chambers to the next casting chamber through gaps that are formed between the bead and the ribs under the thrust of the casting material.

References Cited by the Examiner

UNITED STATES PATENTS

| | | | |
|---|---|---|---|
| 2,335,222 | 11/1943 | Storch | 18—59 |
| 2,415,961 | 2/1947 | Nast | 18—42 |
| 2,464,050 | 3/1949 | Morin | 18—36 XR |
| 2,471,258 | 5/1949 | Bolten | 18—36 |
| 2,500,258 | 3/1950 | Mazzoni | 18—30 |
| 2,577,584 | 12/1951 | Hofreiter | 18—59 |
| 2,965,932 | 12/1960 | Knowles | 264—251 |
| 3,086,269 | 4/1963 | Taylor | 24—205.11 |
| 3,087,217 | 4/1963 | Morin | 24—205.11 |

ROBERT F. WHITE, *Primary Examiner.*

MICHAEL V. BRINDISI, *Examiner.*